April 14, 1953 R. B. BASHAM 2,635,137
APPARATUS FOR CONTROLLING INTERNAL TEMPERATURES
OF FOODS WHILE COOKING SAME
Filed Dec. 26, 1951 2 SHEETS—SHEET 1

RAYMOND B. BASHAM
INVENTOR

BY Herbert J. Brown
ATTORNEY

THERMOMETERS

RAYMOND B. BASHAM
*INVENTOR.*

BY *Herbert J. Brown*

*ATTORNEY*

Patented Apr. 14, 1953

2,635,137

UNITED STATES PATENT OFFICE 2,635,137

APPARATUS FOR CONTROLLING INTERNAL TEMPERATURES OF FOODS WHILE COOKING SAME

Raymond B. Basham, Fort Worth, Tex., assignor to Westronics, Inc., Fort Worth, Tex., a corporation of Texas Application December 26, 1951, Serial No. 263,351

3 Claims. (Cl. 175—320)

This invention relates to temperature indicating and control apparatus for processing food. Particularly, the invention has reference to a device for cooking meat.

An object of the invention is to accurately indicate the internal temperature of meat during smoking or curing operations.

Another object of the invention is to control and maintain a constant temperature in meat being processed after the desired maximum temperature therein has been reached.

Another object of the invention is to provide an alarm, both visual and audible, for indicating the desired internal temperature of the meat being cooked.

Another object of the invention is to provide an electrical probe for a meat curing control device wherein the lengths of the electrical leads do not affect the accuracy of the temperature measurement.

Another object of the invention is to provide a relatively inexpensive device for the described purposes.

Another object of the invention is to prevent loss of weight of the meat being cured due to shrinkage, a result of excessive cooking.

Another object of the invention is to provide a means for controlling the texture and color of the meat being cured.

The invention will be more readily understood by reference to the following description and the accompanying drawings, wherein.

Figures 1, 2:
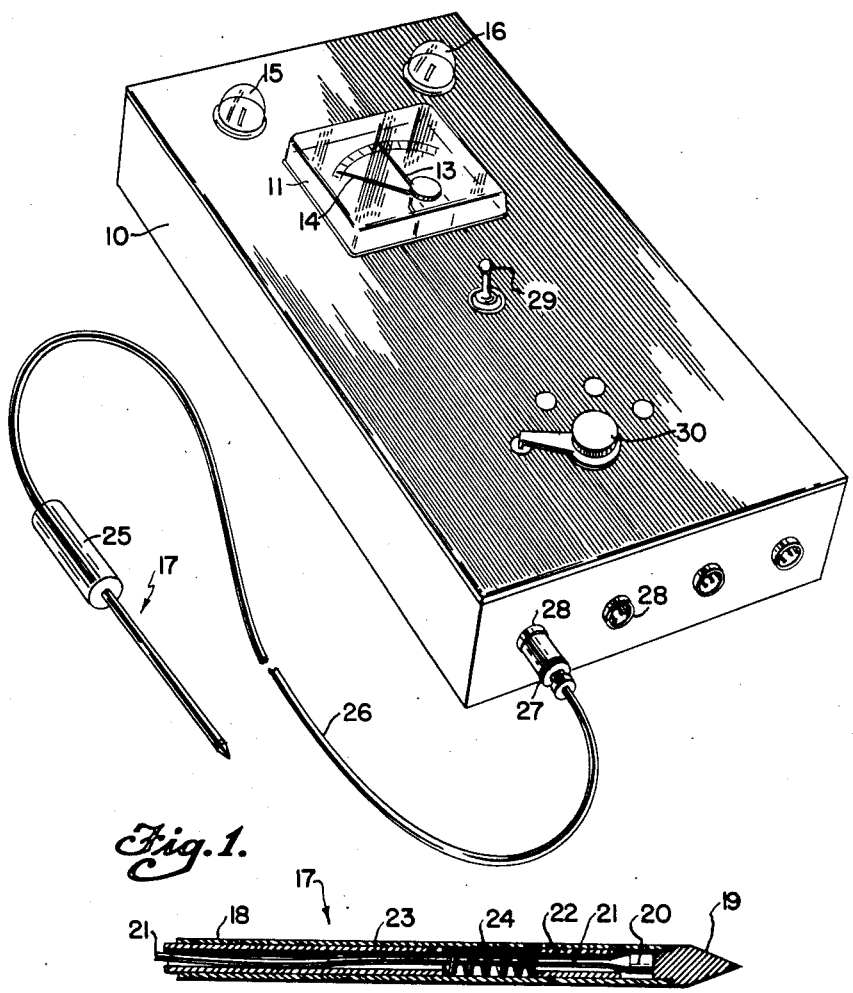
Figure 1 is a perspective view of an exemplary form of meat temperature control and temperature indicating device embodying the features of the invention.
Figure 2 is a broken longitudinal sectional view of a probe forming a part of the invention.

The exemplary form of the invention shown includes a box-like housing 10 having a contact making meter 11 mounted in panel 12. The type of meter shown includes a manually adjustable pointer contact 13 for co-action with the electrically movable pointer 14 for controlling the hereinafter described circuit. Neon lights 15 and 16, forming a part of the circuit, are also mounted on the panel 12.

A feature of the invention has to do with a novel probe thermometer 17, which may be used singly or in multiples, for contacting the center of the meat to be cured or cooked, and which probe includes a tube 18, a tapered point or tip 19 of heat conducting material mounted in one end thereof, a negative co-efficient resistor element 20 within the tube and arranged against the inner surface of the tip, together with an insulated lead 21 extending from said element outwardly through the end of the tube opposite said tip. Contact is maintained between the element 20 and the tip 19 by means of a slidable sleeve 22 of insulating material within the tube 18, a stationary sleeve 23 also within said tube, and a compression spring 24 between the opposing ends of said sleeves. The rearward end of the tube 18 is provided with a tubular handle 25, together with a dual conductor cable 26 for electrically connecting the lead 21 and the tube 18 with a plug 27 which, in turn, is inserted in a receptacle 28 in the housing 10. A toggle switch 29 for turning the power source on and off, and a selector switch 30 for selecting the probe thermometer 17 to be indicated by the meter 11 are also shown in Figure 1 and will be hereinafter referred to.

Figure 3:
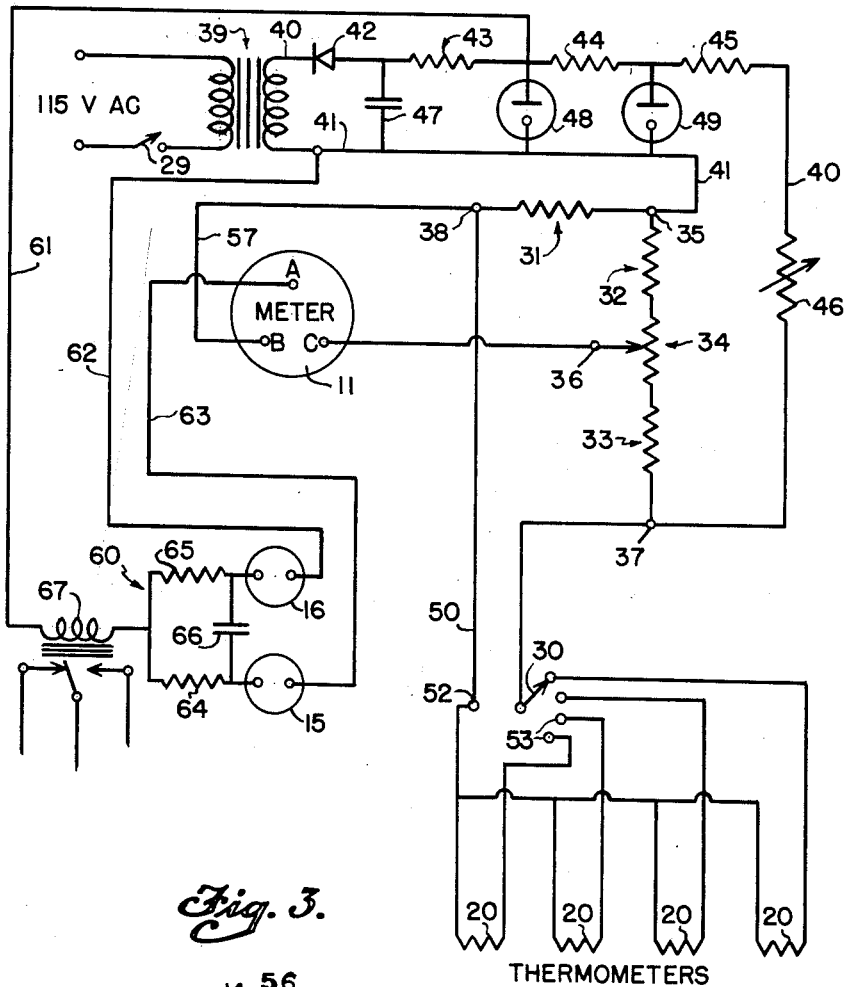
Figure 3 is a schematic diagram of a preferred circuit forming a part of the invention.

The electrical circuit shown in Figure 3 includes an electrical bridge, the four arms of which are comprised of fixed resistors 31, 32 and 33, and one of the temperature sensitive resistors 20, previously referred to as a part of the probe 17. An adjustable potentiometer 34 is connected between two of the resistors 32 and 33, thus providing a means for balancing the bridge with a value corresponding with the minimum temperature resistance of the temperature sensitive element 20 of which temperature is to be indicated on the meter 11. The terminals between the four arms 31, 32, 33 and 20 of the bridge are indicated by the numerals 35, 36, 37 and 38, respectively.

The bridge is supplied with direct current by means of a transformer 39 which is connected with an alternating current source, and the leads 40 and 41 therefrom are connected with two of the opposing terminals 35 and 37 which are located on opposite ends of the fixed resistors 32 and 33 having the potentiometer 34 therebetween. One of the leads 40 is provided with a rectifier 42 and three fixed resistors 43, 44, 45 together with a variable resistor 46, all of which are connected in series between the transformer 39 and the referred to contract 37 in the order named. A condenser 47 is connected in parallel with the two leads 40 and 41 between the rectifier 42 and the first of the last referred to fixed resistors 43. Voltage regulators 48 and 49 are also connected in parallel with the leads 40 and 41 between the three fixed resistors 43, 44 and 45. The first referred to voltage regulator 48 has a greater voltage drop than the last referred to voltage regulator 49, and whereby a more constant voltage regulation is provided. As will become apparent from the description of operation, the voltage supplied to the bridge must be stable and well below the maximum error tolerable in the final measurement at the meter 11.

As shown in Figure 3, the thermometer elements 20 are selectively connected with the terminals 37 and 38 of the bridge by leads 50 and 51. Corresponding sides of the thermometer elements 20 are all connected with a single terminal 52, in the lead 50, whereas the remaining sides of said elements are connected with switch contacts 53 of the previously referred to selector switch 30.

Figure 4:
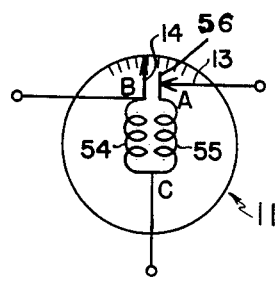
Figure 4 is an internal wiring diagram of the meter shown in Figure 3.

A wiring diagram of the meter 11 is shown in Figure 4, and which diagram shows the meter to be a contact making meter such as may be bought on the open market with a complex movable element having four parts which are coupled together mechanically and move as a unit. These four parts are: an indicating pointer 14, an operating or deflecting coil 54, a holding coil 55, and a movable contact 56. The movable contact 56 is arranged to make contact with the adjustable pointer contact 13. The electrical terminal to the adjustable pointer contact 13 is labelled with letter A, and the electrical terminals to the operating coil 54 are identified by letters B and C. The operating coil 54 and the holding coil 55 are connected together at a common point, indicated by letter C, which is connected to output terminal 38 of the bridge.

An interrupting circuit 60 is connected between the first two resistors 43 and 44 of the supply lead 40 by means of a lead 61 and the remaining supply lead 41 by means of another lead 62 and to terminal A of meter 11 by lead 63. The first referred to lead 61 of the interrupting circuit 60 is divided and is connected with separate neon lamps 15 and 16, previously referred to, after passing through resistors 64 and 65, respectively. A condenser 66 is connected between the resistors 64 and 65 between the latter and the neon lamps 15 and 16. The lamps 15 and 16 are thence connected with the previously referred to leads 62 and 63 and with the supply lead 41 and the meter terminal A, as previously described. A control relay 67 is connected in the first referred to lead of the interrupting circuit and has for its purpose the regulation and control of a heat control valve or the like, not shown, such as those ordinarily used in smoke houses, ovens or the like. An audio alarm, not shown, may also be included in connection with the relay 67.

In operation, the panel 12 is installed on the outside of a smokehouse, oven or other cooking compartment where the meter 11 and the neon lamps 15 and 16 will be visible to the operator. Inside of the smokehouse or the like, the probe or probes 17, as the case may be, are inserted in the meat to be cooked with the pointed probe tip 19 near the center thereof. The bridge is initially balanced by means of the adjustable potentiometer 34, and the variable resistor 46. The adjustable potentiometer 34 is used to adjust the minimum scale reading desired, and the variable resistor 46 is used to adjust the full scale reading. Preferably, the adjustments of the potentiometer 34 and the variable resistor 46 are made at the time of fabricating the described temperature indication apparatus and need not be adjusted thereafter. The adjustable contact point 13 may be manually adjusted by the operator to control the internal temperature desired. When the movable contact 56 contacts the adjustable contact 13 the "cook-off point" has been reached. The contact thus made energizes the relay 67 and the interrupting circuit 60, closing the heat control valve or the like on the smoke house. The operating coil 54 will operate as a normal indicating instrument, deflecting in proportion to the bridge output voltage across terminals B and C, and the movable pointer 14 will indicate the bridge output voltage on the scale (not numbered) of the meter 11. Since a D'Arsonval type meter movement, as in the present meter 11, is not capable of exerting sufficient mechanical force to maintain a stable electrical contact, and would tend to either stick or bounce at the critical contact position, a holding coil 55 or the like is necessary to amplify the torque for maintaining contact. The instrument shown uses a holding coil type of torque amplifier comprised of the described coils 54 and 55 which are pivotally mounted, not shown, in the meter 11. In making contact, current flows through leads 61, relay 67, resistor 64, neon lamp 15, terminal A, holding coil 55 and through terminal C back to terminal 35 and line 41. The current flowing through holding coil 55 provides the additional torque referred to so as to maintain stable electrical contact between contacts 56 and 13. This additional torque normally tends to hold the electrical contacts and would not permit the contacts to open, although the operating coil current may drop to near zero, except for the action of the interrupter circuit 60. Before the contact is made, all the current through the relay 67 and interrupter circuit 60 will flow through resistor 65 and neon lamp 16. The condenser 66 does not allow current flow through the other side of the interrupter circuit or resistor 64. With current flowing through lamp 16, the lamp will glow and will give a steady visual indication to the operator that the temperature is below the critical or pre-set control temperature. As the internal temperature in the meat increases and rises to the value permitting closing of the movable contact 56 and the adjustable contact 13, the neon lamp 15 will be provided with a return path to line 41 whereby current may flow through resistors 64, relay 67 and all resistors in the return path, and at which time the charge of the condenser 66 is reversed which momentarily extinguishes the other lamp 15. When the condenser 66 has become polarized in the opposite direction, the voltage drop across neon lamp 16 will have reached the ionizing potential necessary to cause the lamp 16 to conduct. The period of time involved by the transition of lamp 15 to lamp 16 is dependent on the product of the sum of the resistors 64 and 65 and the condenser 66. It will be noted when neon lamp 16 conducts, neon lamp 15 is extinguished momentarily due to the reversing of polarity in the voltage across condenser 66, but will conduct again at the end of the charge period. This interaction of lamps 15 and 16 will continue as long as the contacts 56 and 13 are closed. The periodic extinguishing of lamp 15 interrupts and momentarily removes current flow through the holding coil 55, movable contact 56, adjustable contact 13 and the remaining resistors and provides a period in which no torque is applied to the contacts which will permit opening of the contacts 56 and 13 if the operating coil current has fallen below the value sufficient to maintain the contact position. While the neon lamp 15 is extinguished, the current through the holding coil 55 is zero and the meter contacts 56 and 13 are permitted to open if the temperature value is such that the operating coil torque is below the critical value. With neon lamp 15 conducting, the current through neon lamp 16 combined with the charging current of condenser 66 and resistor 64 will be sufficient to maintain the relay 67 in a closed position, thus preventing the smoke house from further heating. As the temperature, and thus the deflection of the movable pointer 14, are of high enough value to maintain the contacts 56 and 13 in a closed position during the no current period of holding coil 55, the relay 67 will remain closed and the heating source will be removed allowing the temperatures to diminish. In order to maintain a steady temperature, it will be necessary to reestablish the heating source when the temperature has diminished by a small amount. Since the holding coil 55 and contacts 56 and 13 are being permitted to open periodically, the diminishing temperatures will cause the contacts to break and the lamp 15 will no longer conduct. Lamp 16 will remain conducting but will not have sufficient current to retain relay 67 in closed position, and at which time relay 67 will be de-energized and the source of heat will be reestablished. As long as the contacts 56 and 13 are closed, the lamps 15 and 16 blink alternately and the relay 67 remains closed. The alternate blinking of the lamps 15 and 16 provide visual indication to the operator that the instrument has reached the critical control point and in the shut-off state. An audio alarm, not shown, may be connected to the relay to give additional warning that the critical temperature has been reached.

The present invention is not limited to the construction herein shown and described but may be made in many ways within the scope of the appended claims.

What is claimed is:

1. Apparatus for indicating and controlling internal temperatures in food while processing the same, said apparatus comprising an electrical resistance bridge, one arm of which is in the form of a negative temperature co-efficient resistor element adapted to be inserted in the food to be cooked, a D. C. source of constant voltage connected with the in-put terminals of said bridge, a meter connected across the output terminals of said bridge, said meter including a movable pointer and contact mechanically coupled with each other for operation in unison, an adjustable contact pointer arranged for making contact with the last said contact, an operating coil and a holding coil connected in series with each other and carried by said movable pointer and connected at one end thereof with said contact carried by said movable pointer, an interrupting circuit comprising a pair of gas discharge tubes each having a resistor connected in series therewith, a relay for controlling a heat source connected with both of said resistors on the ends thereof opposite said gas discharge tubes, a condenser connected between the said lamps between the same and the said resistors, the end of said relay opposite said resistors being connected with said D. C. source and one of said gas discharge tubes also being connected on the side thereof opposite its respective said resistors with said D. C. source, the remaining said gas discharge tube being connected with said adjustable contact forming a part of said meter.

2. In apparatus for indicating and controlling internal temperatures in food while processing the same as defined in claim 1, a probe adapted to be inserted in said food and including said negative co-efficient resistors therein and forming a part thereof, said probe comprised of a tube having a tapered point of heat controlling material on one end thereof and having said negative co-efficient resistor elements mounted in said tube and against the inner end of said tapered point, and spring means carried within said tube retaining said element in its described position.

3. In combination with a contact meter as described in claim 1, an interrupting circuit comprising a pair of gas discharge tubes each having a resistor connected in series therewith, a relay forming a part of said interrupting circuit and connected with both of said resistors on the ends thereof opposite said gas discharge tubes, the end of said relay opposite said resistors being connected with one side of a D. C. source and one of said neon tubes being connected on the side thereof opposite its respective resistor with the remaining side of said D. C. source, and means connecting the remaining said tube on the side thereof opposite its respective said resistor with said adjustable contact in said meter.

RAYMOND B. BASHAM.

No references cited.